United States Patent [19] [11] 4,082,044
Day [45] Apr. 4, 1978

[54] ADJUSTABLE FLUID DUNNAGE SYSTEM

[75] Inventor: Gerald Glynn Day, Marietta, Ga.

[73] Assignee: The Coca-Cola Company, Atlanta, Ga.

[21] Appl. No.: 617,567

[22] Filed: Sep. 29, 1975

[51] Int. Cl.² .......................... B60P 7/14; B60P 7/16; B61D 3/00; B61D 45/00
[52] U.S. Cl. ................................. 105/376; 105/496; 280/179 R
[58] Field of Search ............... 105/376, 489, 493, 495, 105/496, 491, 492, 494, 490; 280/179 R, 179 A, 179 B

[56] References Cited
U.S. PATENT DOCUMENTS

| Re. 26,249 | 8/1967 | Lundrall | 105/376 X |
|---|---|---|---|
| Re. 26,500 | 12/1968 | Moorhead et al. | 105/495 |
| 2,160,870 | 6/1939 | Jones | 105/376 |
| 3,005,419 | 10/1961 | Loomis et al. | 105/376 |
| 3,327,647 | 6/1967 | Rolfe, Jr. | 105/376 X |
| 3,754,516 | 8/1973 | VanGompel | 105/496 |
| 3,847,091 | 11/1974 | Holt | 105/496 |
| 3,915,096 | 10/1975 | Salisbury | 105/492 |

Primary Examiner—Robert J. Spar
Assistant Examiner—Howard Beltran
Attorney, Agent, or Firm—W. Dexter Brooks

[57] ABSTRACT

A dunnage system for restraining cargo in the freight compartment of transport vehicles is described. Movable walls extend along each of the longitudinal walls of the freight compartment and are adjustable in orthogonal directions thereto. Hydraulic cylinder means are provided for moving the walls simultaneously and for maintaining a substantially constant wall pressure on the cargo retained between the walls. Also, automatic retraction means are provided for moving the longitudinal walls away from the cargo for ease in unloading the cargo from the transport vehicle.

16 Claims, 4 Drawing Figures

ADJUSTABLE FLUID DUNNAGE SYSTEM

BACKGROUND OF THE INVENTION

1. Field of the Invention

The present invention relates to a dunnage system for transport vehicles. More specifically, the present invention relates to a dunnage system particularly well suited for transporting stacked articles such as cases of bottled beverages.

2. Description of Prior Art

It is well known that a need exists in the transportation of cargo to shore up misaligned loads and preclude the shifting of cargo in the transport vehicle. This need is particularly acute when the transport vehicle is carrying less than a full load.

Heretofore, there have been many approaches to fulfilling this need which for one reason or another are not totally satisfactory. For example, it is known to wedge foam or corrugated material around the cargo to preclude shifting or damage thereof. It is also known to use such things as restraining straps or bars. However, the use of all of these devices requires manual time consuming labor, since repositioning or adjustment of such devices is necessary during loading and unloading operations.

Other devices have been contemplated, which include a plurality of adjustable panels disposed longitudinally of the freight compartment of a transport vehicle. The panels of these devices are selectively movable transversely of the freight compartment to accomodate cargo loads of different widths. However, these devices are not completely automatic and therefore, require more manual supervision than is desirable. Moreover, these devices are not adjustable during transport of the cargo. Therefore, misaligned cargo can not be straightened in transit. Furthermore, vibration, resulting from the vehicle moving, causes heretofore shoring devices to become disengaged from the cargo, which in turn, causes the cargo to become misaligned during transit. In addition the use of a plurality of panels can result in the application of uneven restraining forces longitudinally of the transport vehicle. Examples of prior art devices of the type described are illustrated in U.S. Reissue Patent Re No. 26,500 issued Dec. 10, 1968 to J. R. Moorhead et al and U.S. Pat. 3,847,091 issued Nov. 12, 1974 to Jan D. Holt.

SUMMARY OF THE INVENTION

Accordingly, it is a primary object of the present invention to provide an automatically adjustable dunnage system for supporting loads of varying widths during transport.

It is another object of the present invention to provide a dunnage system whereby misaligned loads can be straightened automatically during transport.

It is another object of the present invention to provide a mechanism for extending and retracting restraining walls in a freight compartment so as not to interfere or otherwise obstruct the expeditious loading and unloading of stacked articles on pallets in the transport by means of a conventional pallet forklift.

It is still another object to provide a housing for protecting the mechanism means of the present invention from road hazards such as dirt, gravel, or adverse weather conditions.

It is a further object to provide an automatically adjustable dunnage system on a transport vehicle which is electrically compatible with either positive or negative grounded electrical systems of the towing vehicle.

It is a further object of the present invention to provide front to rear stabilization of the load during transport.

It is still a further object of the present invention to provide means to automatically apply a constant restraining force to cargo loads during transport.

It is still a further object of the present invention to provide a dunnage system which is compact and designed to occupy a minimum amount of space in the freight compartment of a transport vehicle when the dunnage system is not being used.

The objects of the present invention are fulfilled by providing a pair of automatically adjustable walls which extend longitudinally of and parallel to the walls of a freight compartment in a transport vehicle. The walls are substantially coextensive with the longitudinal walls of the freight compartment. Hydraulic drive means are provided for simultaneously moving the walls transversely of the freight compartment toward or away from the side walls of said compartment. A plurality of hinge means are disposed along each of the movable walls and constrain said walls in all adjustable positions in a substantially parallel relationship with the longitudinal walls of the transport vehicle.

The hinge means include roller means which rest on the floor of the freight compartment and support the walls for rolling movement transversely of the freight compartment.

The hydraulic drive system further includes pressure control means which senses the pressure or restraining force applied to the cargo as a function of hydraulic pressure in the drive system and automatically maintains said restraining force constant in response to the hydraulic pressure sensed. This feature is particularly useful for it facilitates the automatic straightening of misaligned loads during transport.

The dunnage system of the present invention further includes a gate means for providing front to rear stabilization of the cargo in the transport vehicle. The gates means is removably positionable between the movable walls along track means extending substantially longitudinally of the freight compartment. The track means are provided with spaced holes in which the gate means is removably supported.

The apparatus and system of the present invention are particularly well suited for restraining stacked articles such as cases of bottled beverages. However, it should be understood that other types of cargo may be used without departing from the spirit and scope of the present invention.

BRIEF DESCRIPTION OF THE DRAWINGS

The objects of the present invention and the attendant advantages thereof will become more readily apparent by reference to the following drawings wherein.

DETAILED DESCRIPTION OF PREFERRED EMBODIMENTS

Figure 1:
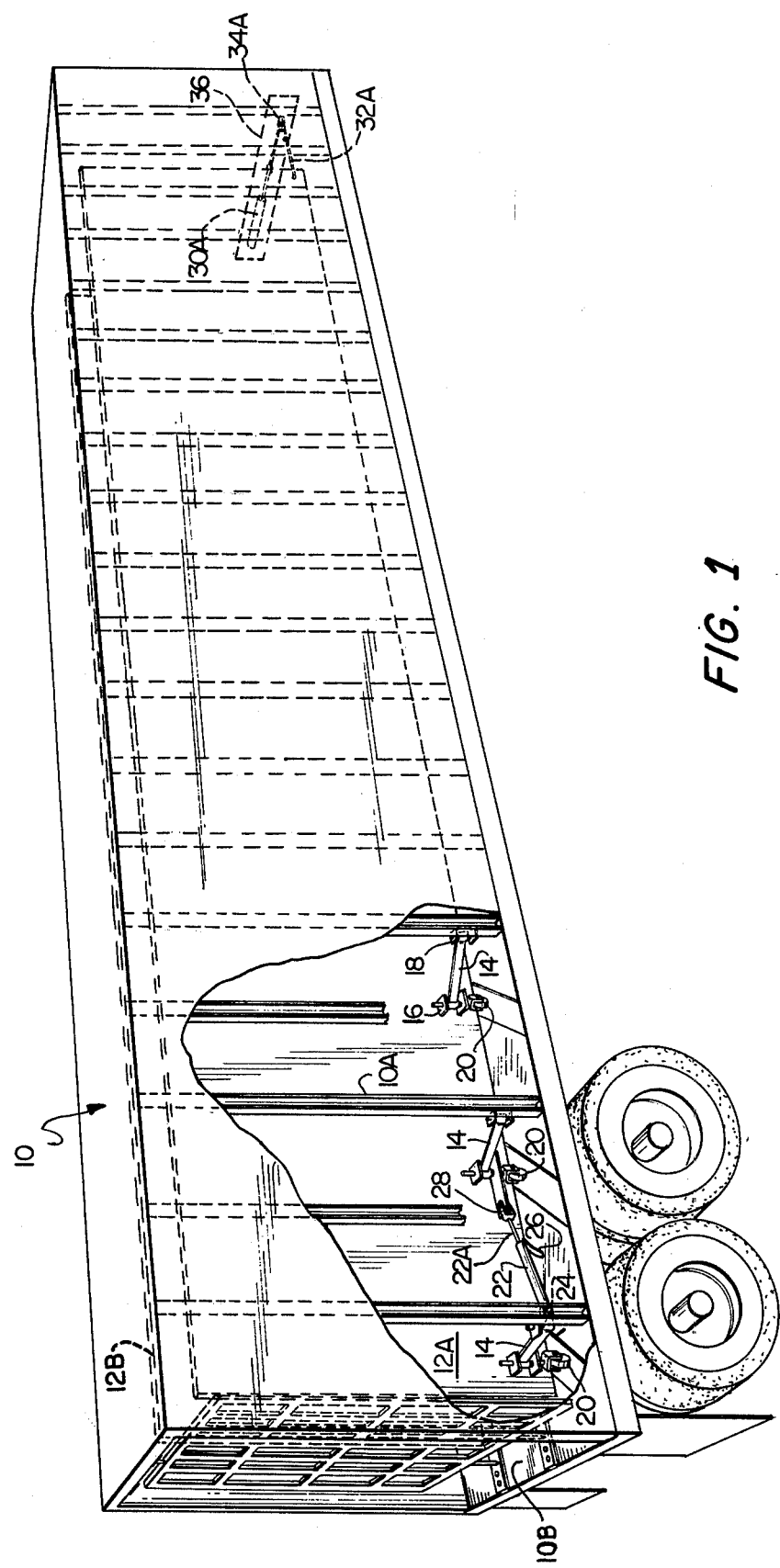
FIG. 1 is a perspective view of a freight compartment of a transport vehicle for use with the present invention illustrating the movable walls, the hinge assembly, and hydraulic drive means of the present invention.

Referring to the details of FIG. 1 there is illustrated in perspective a transport vehicle with which the dunnage system of the present invention may be utilized. A portion of the freight compartment side wall has been removed in order to illustrate the movable walls of the present invention, the hinge assembly therefor, and the hydraulic drive means for retracting the walls against the side walls of the freight compartment.

More specifically, FIG. 1 illustrates a transport vehicle having a freight compartment generally designated 10. A pair of movable side walls 12 are disposed within the freight compartment longitudinally thereof in substantial parallel alignment with the longitudinal walls of the compartment. Walls 12 are substantially coextensive with the longitudinal inside dimensions of the freight compartment 10. Walls 12 are adjustably movable transversely of the compartment 10 to accomodate cargo loads of varying widths therebetween.

As further illustrated in FIG. 1 there is provided a hinge assembly for supporting movable walls 12 and for constraining the same in a substantially parallel relationship to the longitudinal walls of compartment 10 through the entire range of adjustment. It should be understood that all hinges of the assembly are not illustrated, for the sake of simplicity. However, each wall or panel 12 has a top and bottom row of hinges which are equally spaced along the entire length of walls 12.

Referring to the details of the hinge assembly, each assembly includes a pivotable link 14 attached to upstanding wall supports 10A of the freight compartment by bracket 18. One end of link 14 is pivotally supported on a pintle passing vertically through bracket 18. The other end of link 14 is pivotally supported on a pintle passing vertically through bracket 16 attached to movable walls 12. Accordingly, link 14 is free to rotate in the horizontal plane parallel to the cargo bed. On each of the lower hinge assemblies a support roller 20 is provided at the base of bracket 16. Accordingly, walls 12 and the hinge assemblies therefor rest on rollers 20 which roll on the floor 10B of freight compartment 10. In this manner the walls 12 may be rolled inwardly or outwardly of the freight compartment by the adjustment means to be discussed hereinafter.

The hinge assembly is dimensioned so that when walls 12 are fully retracted, the hinge assemblies are recessed in the side walls of compartment 10 between vertical supports 10A. Thus, walls 12 can be fully retracted against the side walls of compartment 10 without interference from the hinge assemblies.

Figure 2:
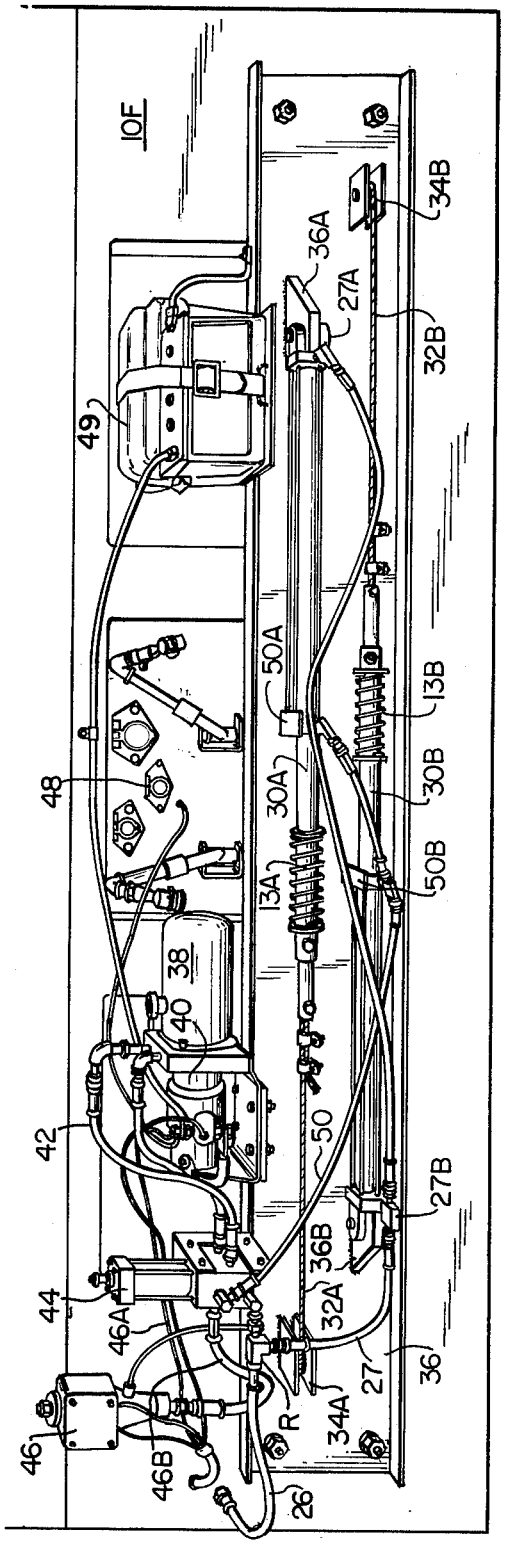
FIG. 2 is a diagrammatic view of the hydraulic drive system of the present invention.

Also illustrated in FIG. 1 at the front end of freight compartment 10 is a hydraulic 30 cylinder and a cable 32 passing over a pulley 34 and attached to wall 12A. A like set of components are provided for wall 12B, as illustrated in FIG. 2. As will be described further hereinafter, energization of hydraulic cylinder 30 pulls cable 32A over pulley 34A and moves wall 12A inwardly against the cargo load. Wall 12B is moved simultaneously in a like manner by its corresponding hydraulic mechanism.

To provide for the reverse movement or retraction of walls 12A, 12B a pair of hydraulic cylinders 22 (at least one for each wall) are provided at the aft end of freight compartment 10. One end of cylinder 22 is pivotally mounted in bracket 28 affixed to walls 12 and the other end of cylinder 22 is pivotally mounted in bracket 24 affixed to a vertical support 24. Cylinder 22 includes a piston 22A which is retracted into cylinder 22 in response to the energization of cylinder 22 with fluid pressure. Accordingly, upon energization cylinders 22 pull walls 12A, 12B back against the side walls of compartment 10.

The hydraulic drive system of the present invention can be more fully understood by reference to FIG. 2 wherein there is generally shown a drive system support bracket 36 bolted or secured by other suitable means to the outside of front bulkhead 10F of freight compartment 10. Cylinders 30A, 30B are suitably secured on support bracket 36 by brackets 36A, 36B, respectively.

The hydraulic force of the drive system is provided by a pump 38 which is driven by a motor 40. The pumped hydraulic fluid passes through hose 42 to a directional valve 44 which allows the fluid to flow either through hose 26 to cylinders 22 used to move the walls 12 away from the transported load or through hose 50 to the cylinders 30 used to move the walls 12 against the load.

Hose 50 is connected to the respective cylinders 30A, 30B through couplings 50A, 50B. Since both cylinders 30 are energized by the same hydraulic supply line 50, said cylinders are always actuated simultaneously. Thus, walls 12A, 12B are also actuated simultaneously.

Hose 26 for cylinders 22 discussed hereinbefore passes longitudinally of compartment 10 and is coupled at one end to both cylinders 22 and at its other end to valve 44 through a Y-type fitting R. Also coupled to fitting R is a hose 27 which is coupled to the other ends of cylinders 30A, 30B through fittings 27A, 27B. The purpose of hose 27 and fittings 27A, 27B is to return hydraulic cylinders 30A, 30B to fully extended positions while walls 12A, 12B are being retracted. In this manner cylinders 30A, 30B are reset in preparation for the next time the walls are to be pulled inwardly against the cargo bed.

Each of cylinders 30A, 30B is provided with a spring 13A, 13B. These springs provide potential energy to assist the hydraulic forces in moving the walls.

Further provided in the drive system is a pressure control switch 46. Switch 46 senses pressure in the hydraulic drive system through hose 46B. When they hydraulic pressure builds up to predetermined maximum, pressure switch 46 generates an electrical signal through lines 46A which turns motor 40 OFF. When the hydraulic pressure drops to a preset minimum, switch 46 automatically turns motor 40 ON thus keeping the transported load under constant hydraulic pressure.

Thus, pressure switch 46 provides an automatic control for restraining misaligned cargo during transport. For example, as cargo is compressed and compacted by the walls 12A and 12B during transport, the pressure in hydraulic cylinders 30A and/or 30B is reduced, in which event, switch 46 automatically turns motor 40 ON and restores the predetermined maximum force of the walls onto the cargo.

Pressure switches of the type described are well known for other uses and are commercially available. Accordingly, any type of such switches may be used without departing from the spirit and scope of the present invention.

Another feature of the present invention is that the dunnage system is designed to take advantage of the vibrations, on the transport vehicle bed, which take place during transit. These vibrations reduce the friction between the cargo and vehicle bed and thus, enable the cargo to be compressed and compacted to a greater degree with the least amount of wall pressure than would otherwise be possible without these vibrations. Needless to say, without the interaction of the vibrations, it would be necessary to rely solely upon wall pressure on either side of the cargo to straighten misaligned cargo.

The pump motor is electric and is supplied electrical energy by the battery 49. The battery is recharged by the tow vehicle generator through outlet 48 and the entire electrical system of the transport vehicle is compatible with either positive or negative grounded electrical systems of the tow vehicle.

A cover (not shown) enclosing the components of FIG. 2 protects the mechanism from road hazards and/or adverse weather conditions. Also, there are safety features embodied in the actuation switch (not shown) to prevent personnel from being caught between the movable walls and cargo upon operation of the actuation switch. More specifically, a time delay relay is provided in the switch which requires the operator to hold the ON button down for a predetermined time (i.e., 10 seconds) while a warning buzzer sounds to warn anyone within the transport vehicle of the impending movement of the walls.

The system of FIG. 2 is provided with a control panel which may be mounted at any desired location on the transport vehicle. Such a control panel would include an ON-OFF switch and switches to initiate the extending or retracting of walls 12.

Figure 3:
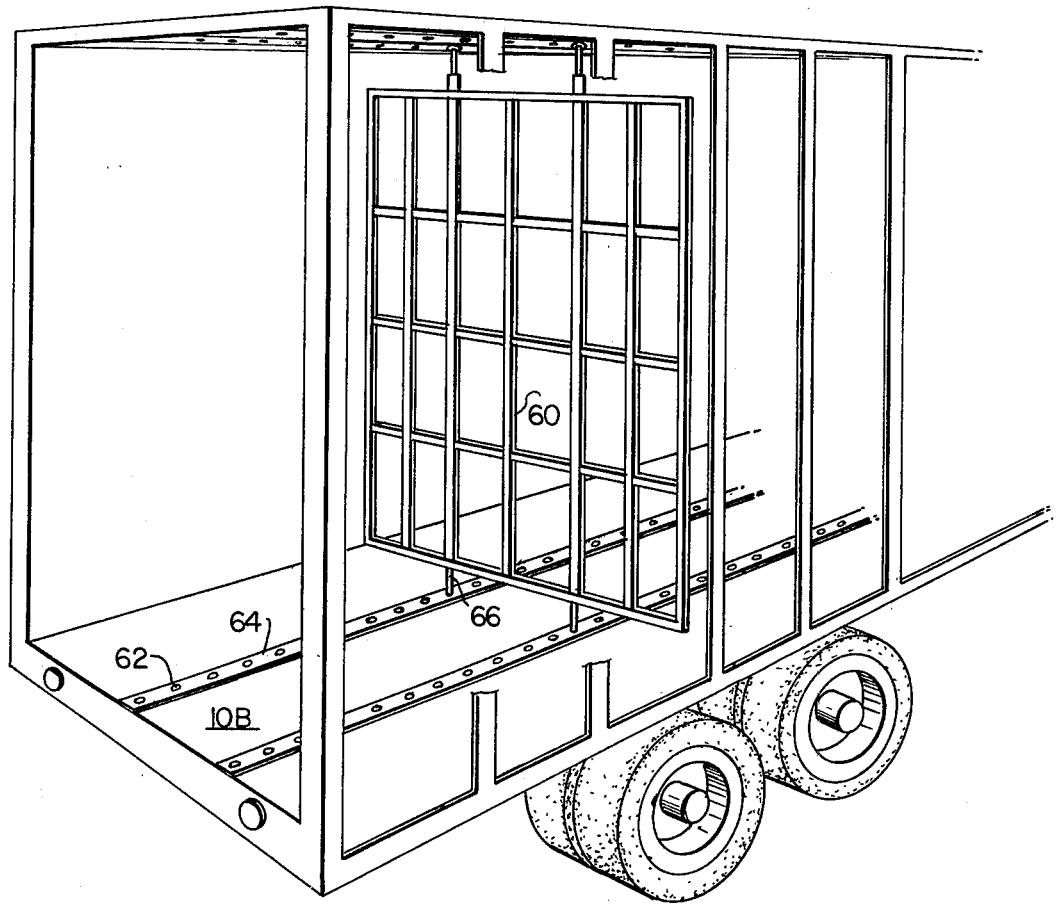
FIG. 3 is a perspective view of a removable gate means disposed within a transport vehicle for use with the moveable walls of the system of the present invention removed.
Figure 3A:
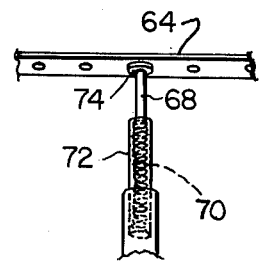
FIG. 3A is an enlarged elevational view of a spring retaining means for the gate means of FIG. 3.

Referring in detail to FIGS. 3 and 3A there is generally illustrated a gate means 60 for precluding shifting of cargo longitudinally of the load bed. It can be seen that gate 60 is selectively located by means of holes 62 in tracks 64. Two pairs of such tracks are provided, one pair extending longitudinally on top of compartment 10 and one pair extending longitudinally of the compartment floor 10B. Pins 68 extending from the top of gate 60 are selectively placed in the upper tracks while pins 66 on the bottom of gate 60 are selectively placed in the lower tracks. Pins 68, as shown in FIG. 3A, are loaded by springs 70 contained within tube 72. Tube 72 is welded or otherwise suitably affixed to gate 60. Pin stop 74 is attached to pin 68 so as to limit free pin movement. Beyond this point springs 70 begin loading gate 60. Lower gate pins 66 are rigidly affixed to gate 60 by welding or other suitable means. When gate 60 is positioned in the upper tracks it is lifted against upper pins 68, against the spring tension of 70. It may then be aligned with the proper lower tracks and dropped into place. Springs 70 will hold the gate in place until an operator lifts up on said gate.

In order to use gate 60 with the dunnage system of FIGS. 1 and 2, the width of the gate is chosen to be no greater than the minimum width of cargo space in which walls 12A, 12B are adjustable.

Referring briefly to the operation of the dunnage system of the present invention, cargo (not shown) is loaded through the rear of compartment 10 between walls 12A, 12B by any well known loading mechanism, such as a forklift truck or a roller bed system. After loading is completed, the gate 60 may be put in place to prevent shifting of cargo fore and aft of the transport vehicle. The driver of the vehicle then energizes the hydraulic system from the control panel by turning the system ON and closing a suitable switch to energize hydraulic cylinders 30. Thus walls 12A, 12B are moved against the sides of the cargo to restrain the same in place. Pressure switch 44 keeps a constant pressure on the cargo to correct for misaligned loads during transport.

When the transport vehicle stops to make a delivery, another switch on the control panel is actuated to supply fluid to cylinders 22 and to reset cylinders 30. Thus, walls 12A, 12B are retracted. Gate 60 is then removed and portions of the cargo are unloaded. The initial procedure is then repeated to shore up the remaining cargo.

Thus, a system has been described for quickly and efficiently restraining cargo in a transport vehicle before and continuously during transit. The system is of rugged, compact construction and includes an integral and depending restraining assembly for shoring up cargo automatically before and during transit. The system occupies a minimum amount of space in the freight compartment of a transport vehicle when the system is not being used. Moreover, the system includes automatic retraction means for moving the longitudinal walls away from the cargo for ease in unloading the cargo from the transport vehicle. The system is a totally automatically operated shoring system which applies constant pressure on the cargo, regardless of its number and/or size, and is completely compatible with the electrical systems of most tow vehicles.

It is believed that the present invention, its mode of construction, assembly and operation, and many of its advantages attendant thereto should be readily understood from the foregoing description and it should also be manifest that, while preferred embodiments of the invention have been shown and described for illustrative purposes, the structural details are nevertheless capable of wide variation within the purview of the artisan. For example, while the dunnage system in the preferred embodiment utilizes a pair of movable parallel walls on opposite sides of the freight compartment to restrain the cargo, the dunnage system could be modified so as to only utilize a single movable parallel wall to restrain the cargo against the stationary opposite longitudinal wall of the freight compartment. While this would only enable the constant pressure to be applied against one side of the cargo, such an arrangement is clearly within the spirit and scope of the present invention.

It is believed that the present invention, its modus operandi, and many of the advantages attendant thereto should be understood from the foregoing without further description. It also should be manifest that the present invention is capable of wide variation within the purview of the invention as defined in the appended claims.

The embodiment of the invention in which an exclusive property right is claimed are defined as follows.

What is claimed is:

1. A dunnage system for restraining cargo in the freight compartment of a transport vehicle comprising:
    at least one movable parallel wall disposed on one side of said freight compartment and in parallel with the longitudinal side walls of said freight compartment;
    drive means for moving said wall transversely of said freight compartment into and out of restraining engagement with said cargo; and means for operating said drive means in response to changes in the pressure that the movable wall is exerting on the cargo for maintaining a constant and adjustable pressure of said movable wall on said cargo prior to and during transport thereof.

2. The system of claim 1, wherein at least two movable parallel walls are disposed on opposite sides of said freight compartment and in parallel with the longitudinal side walls of said freight compartment, said walls providing a constant pressure on said cargo therebetween prior to and during transport thereof.

3. The system of claim 2 wherein only two movable walls are provided, said walls being substantially coextensive with the longitudinal side walls of said freight compartment.

4. The system of claim 2 wherein said drive means includes means for simultaneously moving said walls.

5. The system of claim 1 wherein said drive means comprises:
a fluid media;
means for pressurizing said fluid media;
cylinder means having a movable piston therein, said piston being coupled to said movable wall;
means for selectively supplying said fluid to said cylinder means to move said piston and wall coupled thereto in selected directions.

6. The system of claim 5 wherein said means for automatically maintaining a constant pressure of said wall on said cargo comprises means for sensing the pressure of said fluid media and means for maintaining said pressure of said fluid media substantially constant.

7. The system of claim 6 wherein said means for pressurizing said fluid media comprises a pump and said pressure control means comprises pressure switch means for turning said pump OFF when said fluid media reaches a predetermined maximum pressure and turning said pump ON when said fluid media reaches a predetermined minimum pressure.

8. The system of claim 1 wherein there is further provided a hinge assembly, said hinge assembly including a plurality of pivotal links spaced longitudinally along the longitudinal side wall of said freight compartment, said pivotal links being pivotally connected at first ends thereof to the longitudinal side wall of said freight compartment and at second ends thereof to said movable wall, said pivotal links being pivoted simultaneously by said drive means through arcuate paths between a retracted position adjacent the side wall of said freight compartment to extended positions inboard of said side wall.

9. The system of claim 8 wherein said hinge assembly is so dimensioned and so mounted that it is recessed within said side walls when in said retracted position.

10. The system of claim 8 wherein said hinge assembly includes roller means coupled thereto for rolling engagement with the bottom of said freight compartment.

11. The system of claim 1 wherein a removable gate means is provided for restraining cargo movement longitudinally of said freight compartment, said gate means being selectively disposed at predetermined positions longitudinally of said freight compartment.

12. The system of claim 11 wherein said freight compartment includes track means disposed longitudinally thereof, said track means including spaced indexing means for removably receiving said gate means.

13. The system of claim 12 wherein there is further provided a single pair of movable parallel walls, each of which walls of said pair are disposed on opposite sides of said freight compartment and parallel to the longitudinal side walls of the freight compartment, said walls being moved simultaneously by said drive means into and out of restraining engagement with said cargo.

14. A dunnage system for restraining cargo in the freight compartment of a transport vehicle comprising:
at least one movable parallel wall is disposed on one side of said freight compartment and parallel to the longitudinal side walls of said freight compartment, said movable wall being substantially coextensive with the said longitudinal walls; and
drive means for moving and adjusting said wall transversely of said freight compartment in response to changes in pressure that said movable wall is exerting on the cargo into and out of restraining engagement with said cargo; and
a supporting hinge assembly, including a plurality of pivotal links spaced longitudinally along the longitudinal side wall of said freight compartment, said pivotal links being pivotally connected at first ends thereof to one side wall of said freight compartment and at second ends thereof to said movable parallel wall, said pivotal links being pivoted simultaneously by said drive means through arcuate paths between a retracted position adjacent the said side wall of said freight compartment to extended positions inboard of said side wall.

15. The system of claim 14 wherein said supporting hinge assembly is so diminsioned and so mounted that it is recessed within said side wall when in said retracted position.

16. The system of claim 14 wherein said supporting hinge assembly includes roller means coupled thereto for rolling engagement with the bottom of said freight compartment.

* * * * *